United States Patent
Schmal et al.

(10) Patent No.: US 7,709,069 B2
(45) Date of Patent: May 4, 2010

(54) HIGH TEMPERATURE VENTING BAGS

(75) Inventors: Michael D. Schmal, Orwigsburg, PA (US); Ernest E. Bachert, Orwigsburg, PA (US); John A. Menges, Auburn, PA (US)

(73) Assignee: M & Q Packaging Corporation, Schuylkill Haven, PA (US)

( * ) Notice: Subject to any disclaimer, the term of this patent is extended or adjusted under 35 U.S.C. 154(b) by 890 days.

(21) Appl. No.: 11/300,175

(22) Filed: Dec. 14, 2005

(65) Prior Publication Data

US 2007/0134382 A1    Jun. 14, 2007

(51) Int. Cl.
| | |
|---|---|
| *B32B 27/06* | (2006.01) |
| *H05B 6/80* | (2006.01) |
| *B65D 81/34* | (2006.01) |
| *B65D 33/01* | (2006.01) |
| *B29D 22/00* | (2006.01) |

(52) U.S. Cl. .................. 428/35.7; 219/735; 426/113; 383/103; 428/35.2

(58) Field of Classification Search ................. 428/35.2, 428/35.7; 219/735; 383/45, 100, 103, 207; 426/106, 113, 412, 107
See application file for complete search history.

(56) References Cited

U.S. PATENT DOCUMENTS

| | | | |
|---|---|---|---|
| 3,108,881 A | 10/1963 | Shaw et al. | 99/171 |
| 3,686,823 A | 8/1972 | Perlman | 53/22 |
| 3,716,369 A | 2/1973 | Perlman | 99/1 |
| 3,847,279 A * | 11/1974 | Montgomery | 206/219 |
| 3,915,302 A | 10/1975 | Farrelly et al. | 206/460 |
| 4,003,782 A | 1/1977 | Farrelly | 156/552 |
| 4,141,487 A | 2/1979 | Faust et al. | 229/43 |
| 4,358,466 A | 11/1982 | Stevenson | 426/106 |
| 4,404,241 A | 9/1983 | Mueller et al. | 428/35 |
| 4,535,901 A * | 8/1985 | Okudaira et al. | 215/12.2 |
| 4,765,999 A | 8/1988 | Winter | 426/113 |
| 4,874,620 A | 10/1989 | Mendenhall et al. | 426/113 |
| 5,039,001 A * | 8/1991 | Kinigakis et al. | 229/120 |
| 5,114,766 A | 5/1992 | Jacques | 428/35.7 |
| 5,195,829 A | 3/1993 | Watkins et al. | 383/100 |
| 5,362,152 A | 11/1994 | Fletcher et al. | 383/8 |
| 5,501,525 A | 3/1996 | Cox et al. | 383/103 |

(Continued)

FOREIGN PATENT DOCUMENTS

EP         0218419         4/1987

(Continued)

*Primary Examiner*—Rena L Dye
*Assistant Examiner*—Erik Kashnikow
(74) *Attorney, Agent, or Firm*—Pepper Hamilton LLP (57) ABSTRACT

Provided are high temperature, venting food preparation bags used to package food products for storage, transportation, and preparation and methods for making and using the same. High temperature, venting food preparation bags are composed of a sealed end, an open end, at least one side wall composed of a first thermoplastic film having a vent, and a vent seal composed of a second thermoplastic film. The vent seal is fused to the sidewall via a non-adhesive seal thereby closing the vents. At elevated temperatures, the vent seal at least partially detaches from the side wall thereby opening the vents. Opening of the at least one vent is not dependent upon the accumulation of internal fluid or gaseous pressure, and is compatible with vacuum packaging techniques. Vented cooking techniques are provided that permit browning and crisping of beef and poultry without manipulating the food preparation bag during cooking.

35 Claims, 4 Drawing Sheets

U.S. PATENT DOCUMENTS

| | | | |
|---|---|---|---|
| 5,655,842 A | 8/1997 | Hagino | 383/101 |
| 5,873,218 A | 2/1999 | Kendig | 53/442 |
| 5,928,553 A | 7/1999 | Toshima et al. | 219/725 |
| 5,989,608 A | 11/1999 | Mizuno | |
| 6,030,652 A | 2/2000 | Hanus | 426/107 |
| 6,060,095 A | 5/2000 | Scrimager | 426/107 |
| 6,170,696 B1 | 1/2001 | Tucker et al. | 220/793 |
| 6,290,998 B1 | 9/2001 | Layton et al. | 426/113 |
| 6,306,448 B1 | 10/2001 | Martuch et al. | 426/107 |
| 6,582,123 B1 | 6/2003 | Tang | 383/100 |
| 6,637,939 B2 | 10/2003 | Huffer | 383/64 |
| 6,659,644 B2 | 12/2003 | Gebhardt | 383/103 |
| 6,660,983 B2 | 12/2003 | Monforton et al. | 219/727 |
| 6,682,792 B2 | 1/2004 | Schmal et al. | 428/35.2 |
| 6,884,978 B2 | 4/2005 | Monforton et al. | 219/727 |
| 2003/0183810 A1* | 10/2003 | Fujihana et al. | 252/500 |
| 2005/0276885 A1* | 12/2005 | Bennett | 426/118 |

FOREIGN PATENT DOCUMENTS

| | | |
|---|---|---|
| EP | 0294087 | 7/1988 |
| EP | 06846565 | 9/2009 |

* cited by examiner

HIGH TEMPERATURE VENTING BAGS

FIELD OF THE INVENTION

The present invention relates generally to bags that are used for food service applications, and more, particularly, to high temperature, venting bags that can be used to package food products for storage, transportation, and preparation.

BACKGROUND OF THE INVENTION

Numerous packaging configurations have been adopted for use in food storage, preservation, and cooking. Because of their pliability and low weight, polymer films have been employed for these purposes. Conventional polymer film compositions used in low temperature cooking applications are composed of, for example, polypropylene and polyethylene. Low temperature cooking applications include for example, hot water cooking techniques, i.e., boil-in-a-bag applications. But, conventional bags are not well suited for high temperature cooking applications, such as cooking beef, because they either melt or adhere to food products retained in the bag.

In addition, conventional bags are often fabricated with seals, which incorporate an adhesive, i.e., adhesive-based seals. Although some adhesives provide a dependable seal for low temperature cooking techniques, many adhesives are incompatible with high temperature cooking applications because they either, mechanically fail during high temperature cooking applications, or the adhesive is unsuitable for use with food products at elevated temperatures.

The food packaging industry is constantly in search of stronger, more durable bags that are resistant to tearing and abrasion so as to completely isolate food products from the outside environment. Traditionally, conventional bags have provided preferred mechanical properties, such as tear resistance and durability, by increasing gauge thickness. However, because the amount of polymer used to make a film directly correlates to the overall cost of manufacturing a bag, the cost of using thicker films is often financially impracticable for many packaging applications.

Accordingly, there exists a need for improved food preparation packages and methods of preparing and using the same that overcome the disadvantages associated with conventional food packages.

SUMMARY OF THE INVENTION

Provided are high temperature, venting food preparation bags that can be used to package food products for storage, transportation, and preparation and methods for making and using the same. High temperature, venting food preparation bags, herein referred to as food preparation bags, are composed of a sealed end, at least one side wall having at least one vent, an open end, and at least one vent seal. The at least one sidewall extends away from the sealed end and forms the open end at a distal edge. The at least one vent can be, for example, a gap between two sidewalls, or a plurality of vents, such as for example apertures, or slits in the side wall.

The vent seal is adhered to the exterior or interior surface of the at least one sidewall via a non-adhesive seal, such as a heat seal or ultrasonic seal, to close the at least one vent at, or below, room temperature. At elevated temperatures, including high temperature cooking temperatures above 220° F., the vent seal at least partially detaches from the at least one side wall thereby opening the at least one vent. Opening of the at least one vent is not dependent upon the accumulation of internal fluid or gaseous pressure, and is compatible with vacuum packaging techniques. Cooking with food preparation bags therefore achieves vented cooking of a food product to providing browning and crisping, without manipulating the food preparation bag after it has been placed in an oven.

The at least one sidewall is composed of a first thermoplastic film composed of, as a major portion, a thermoplastic polymer. The at least one vent seal is composed of a second thermoplastic film composed of as a major portion a thermoplastic polymer having a vicat softening temperature different than the vicat softening temperature of the first thermoplastic film. Thermoplastic polymers include, for example, polyesters, polyamides, polyolefins, poly vinyl chloride, polystyrene, or combinations thereof.

Ideally, the at least one sidewall shrinks by at least about 5% at more than about 100° F. so as to impose a tension on the seal between the at least one side wall and the vent seal at elevated temperatures. The tension contributes to the opening of the at least one vent. Venting of food preparation bags at high temperatures via shrinkage of the first thermoplastic film, while maintaining high seal strength at low temperatures, provides ideal packaging for storage and cooking of food products, such as for example beef or poultry.

Methods for making high temperature, venting food preparation bags include the steps of providing first and second thermoplastic films and forming a bag structure without adhesive seals. First, the at least one side wall is prepared using conventional techniques, such as for example using a tubular stock of first thermoplastic film or fusing pieces of first thermoplastic film together to form a bag. Then, the at least one vent seal composed of a second thermoplastic film is operatively fused to the first thermoplastic film via non adhesive seal to close the at least one seal at room temperature, while enabling the at least one vent to open at temperatures sufficient to cook a food product.

Methods for preparing food products using high temperature, venting food preparation bags include the steps of first placing a food product in a high temperature, venting food preparation bag and closing the open end. Then, the food product is heated to a temperature sufficient to cook the food product, including temperatures greater than about 220° F., or greater than about 400° F., during which the at least one sidewall at least partially detaches from the vent seal. High temperature cooking with food preparation bags increases the salable weight of meat, i.e., "meat yield," compared to conventional cooking techniques that do not use bags.

BRIEF DESCRIPTION OF THE DRAWINGS

The numerous features and advantages of the present invention may be better understood by reference to the accompanying detailed description and the following drawings, in which.

DETAILED DESCRIPTION OF ILLUSTRATIVE EMBODIMENTS

Provided are high temperature, venting food preparation bags that can be used to package food products for storage, transportation, and preparation and methods for making and using the same. High temperature, venting food preparation bags, herein referred to as "food preparation bags," are composed of a sealed end, at least one sidewall having at least one vent, an open end, and at least one vent seal. The at least one sidewall extends away from the sealed end and forms the open end at a distal edge. The at least one sidewall is a first thermoplastic film having at least one vent connecting the interior surface of the film to the exterior surface of the film. The first thermoplastic film is composed of, as a major portion, a thermoplastic polymer. The at least one vent seal is a second thermoplastic film which is fused to the first thermoplastic film via a non adhesive seal to close the at least one vent at room temperature. The second thermoplastic film is composed of, as a major portion, a thermoplastic polymer. At cooking temperatures sufficient to cook a food product, the second thermoplastic film detaches from the first thermoplastic film to thereby open the at least one vent. Methods for making food preparation bags include the steps of first providing first and second thermoplastic films and forming a main bag structure without adhesive seals.

Methods for preparing food products using food preparation bags include the steps of first placing a food product in a food preparation bag and heating the food product to a temperature sufficient to cook the food product. During cooking, the at least one sidewall at least partially detaches from the vent seal to vent gas and moisture from the interior of the food preparation bag to promote browning and crisping of the food product.

As used herein "temperature sufficient to cook a food product" means all temperatures known to those skilled in the art for cooking a given food product. As used herein "high temperature cooking" occurs at temperatures of at least about 220° F. As used herein, "bag" means a container for storing or holding an item or multiple items, including for example, vacuum bags, casings, pouches, sacks, and containers used to hold items for packaging, transportation, and cooking.

Figure 1A:
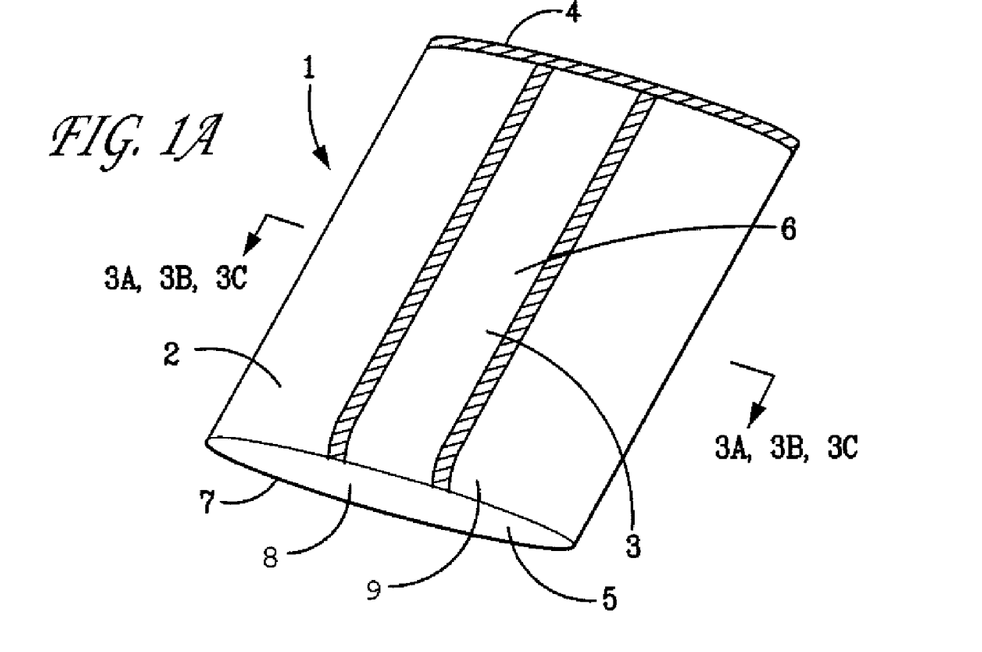
FIG. 1A is a top view of an exemplary high temperature, venting food preparation bag.
Figure 1B:
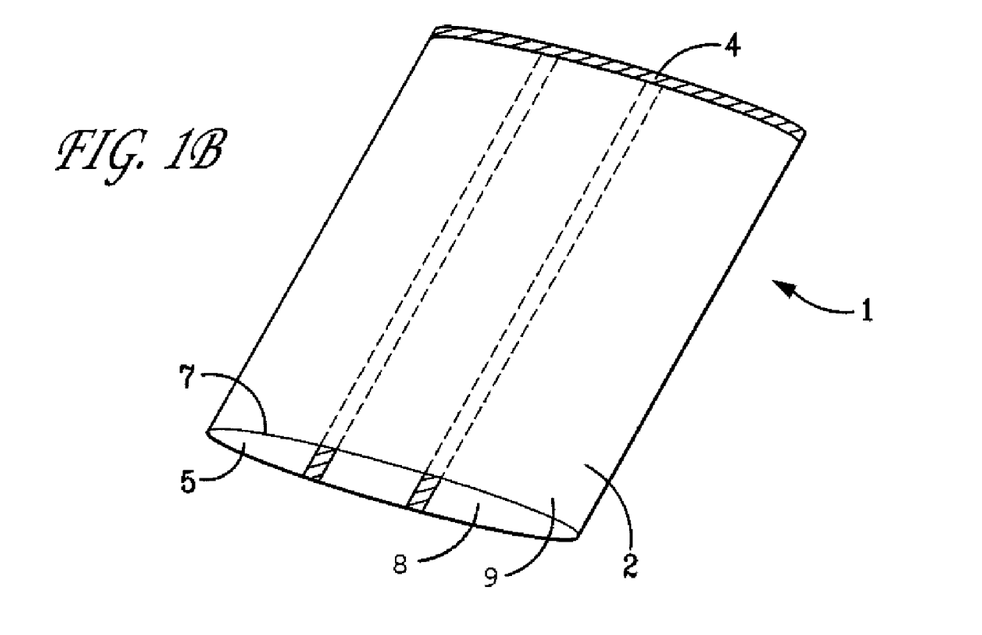
FIG. 1B is a bottom view of an exemplary high temperature, venting food preparation bag.
Figure 2A:
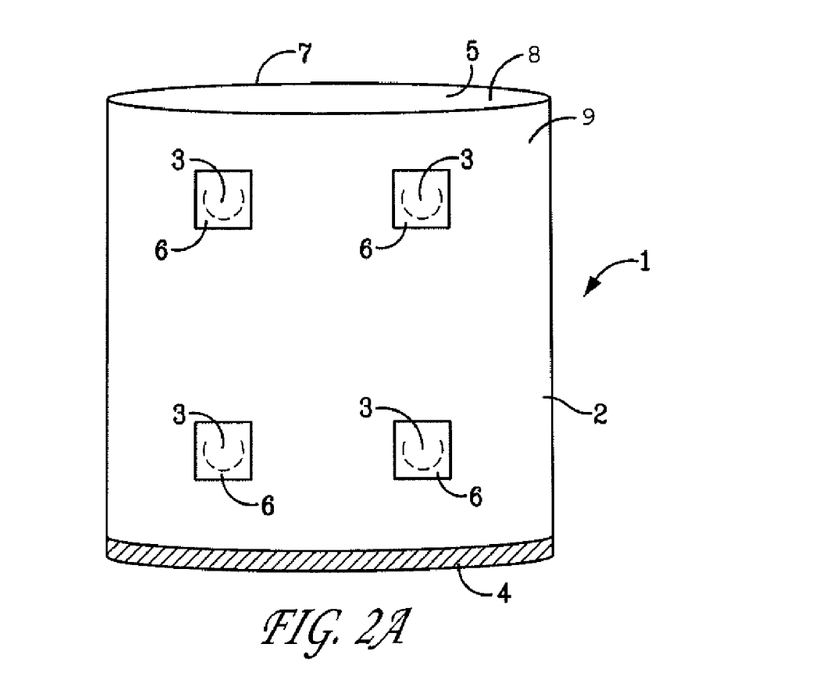
FIG. 2A is a top view of exemplary high temperature, venting food preparation bag having a plurality of vents.
Figure 2B:
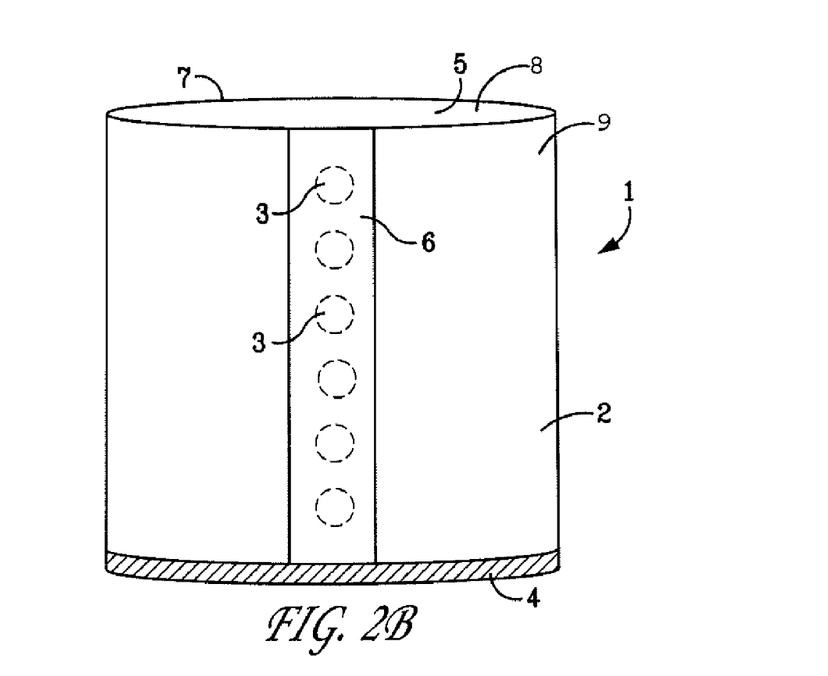
FIG. 2B is a top view of another exemplary high temperature, venting food preparation bag having a plurality of vents.

FIG. 1A is a top view of an exemplary high temperature, venting food preparation bag. FIG. 1B is a bottom view of an exemplary high temperature, venting food preparation bag. FIGS. 2A and 2B are top views of alternate embodiments of exemplary high temperature, venting food preparation bags having a plurality of vents. Referring to FIGS. 1A, 1B, 2A, and 2B, food preparation bags 1 are composed of at least one side wall 2 having at least one vent 3, a sealed end 4, an open end 5, and at least one vent seal 6.

The at least one sidewall 2 is one or more sidewalls composed of a first thermoplastic polymer film which forms a food preparation bag 1. The at least one sidewall 2 can be a tubular stock of film, or individual pieces of a first thermoplastic film that are fused, i.e., non-adhesively sealed, to form a bag. The at least one sidewall 2 includes at least one vent 3.

The at least one sidewall 2 extends away from the sealed end 4 and forms the open end 5 at a distal edge 7. Sealed end 4 is prepared by sealing adjacent edges of the at least one sidewall 2 by non adhesive methods known to those skilled in the art, including techniques selected from the group including heat sealing techniques such as wire impulse sealing techniques, impulse sealing techniques, rotary heat sealing, hot knife heat sealing, hot bar sealing, as well as ultrasonic sealing techniques. Sealed end 4 is preferably a heat seal. In alternate embodiments of food preparation bags composed of individual pieces of a first thermoplastic film that are fused together, the food preparation bag is composed of a plurality of sidewalls 2 that are fused via non adhesive techniques to form a two or more sealed ends 4.

The at least one vent 3 is one or more apertures that connect the interior surface 8 of the at least one sidewall 2 to the exterior surface 9 of the at least one sidewall 2. The at least one vent 3 may be located at the top, sides, end, or bottom of food preparation bags, or may be positioned at any combination of these locations. The size and shape of the aperture is any size and shape known to those in the art. The at least one vent 3 may be, for example, a plurality of slits, punctures, geometric shapes, half-moon shapes, or combinations thereof. As shown in FIGS. 1A and 1B for example, the at least one vent 3 may be a gap, or slit, in the at least one sidewall. As shown in FIGS. 2A and 2B for example, the at least one vent 3 may be a plurality of half moon shaped apertures or circles.

The at least one vent seal 6 is a second thermoplastic polymer film which is fused to the a surface of the at least one sidewall 2 to thereby close, i.e., seal, the at least one vent 3 at, and below, room temperature. The at least one vent seal 6 is any shape known to those skilled in the art that covers the at least one vent 3, including for example, a strip which covers one aperture, or a plurality of apertures as shown in FIGS. 1A, 1B, and 2B, or a plurality of vent seals 6 which cover individual apertures as shown in FIG. 2A.

Figure 3A:
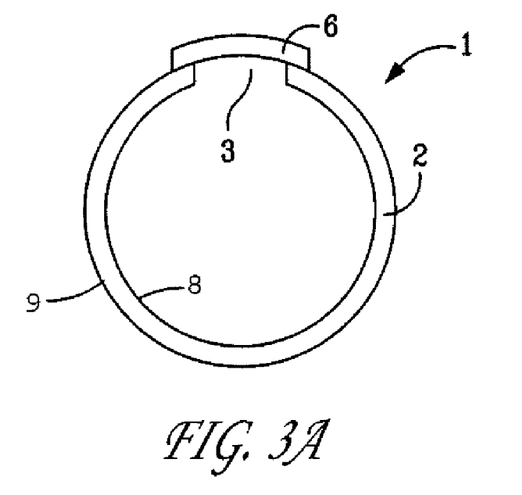
FIG. 3A is a cross sectional view of an exemplary high temperature, venting food preparation bag.
Figure 3B:
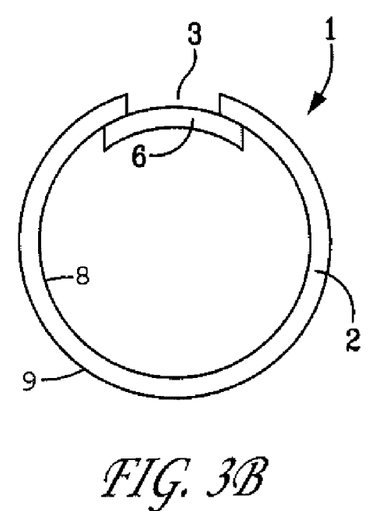
FIG. 3B is a cross sectional view of another exemplary high temperature, venting food preparation bag.

FIGS. 3A and 3B are cross sectional views of exemplary high temperature, venting food preparation bags. Referring to FIGS. 3A and 3B, the at least one vent seal 6 is fused to either the interior surface 8 or the exterior surface 9 of the at least one sidewall 2. The at least one vent seal 6 is fused to the at least one side wall 2 by any non adhesive seal known to those skilled in the art. Non adhesive seals include heat seals, ultrasonic seals, and combinations thereof. Preferably, the at least one vent seal 6 is fused to the at least one sidewall 6 via a heat seal.

The seal between the at least one sidewall 2 and the vent seal 6 is a durable seal that is distinguished from conventional seals that are fabricated to be "intentionally weak." As used herein, "durable" seals are those that are not inherently weaker at non-cooking temperatures than would be acceptable for ordinary food packaging and transportation purposes, such as for use by the food packaging industry. Conventional bags having "intentionally weak" seals are described, for example, in U.S. Pat. No. 6,582,123 B1, which is incorporated herein by reference in its entirety. Conventional bags utilizing adhesive seals are described, for example, in U.S. Pat. No. 3,716,369, which is incorporated herein by reference in its entirety.

The first thermoplastic film is a monolayer or multilayer film composed of, as major portion, thermoplastic polymers. Thermoplastic polymers include conventional thermoplastic polymers, including elastomers, known to those skilled in the art. For example, Thermoplastic polymers include non-elastic polyesters, polyester elastomers, polyolefins, polyamides, such as for example nylons, poly vinyl chloride, polystyrene, or combinations thereof.

Non-elastic polyesters include, for example, polybutylene terepthalate, polyethylene terephthalate, and combinations thereof. Polyester elastomers include, for example, polyester homopolymers and polyester block copolymers, i.e., thermoplastic copolyester based elastomers (TPE-E's or COPE). Polyester block copolymers include any polyester based block copolymer having alternating substantially crystalline segments and low crystalline segments. A description of exemplary polyether-ester block copolymers, polyester-ester block copolymers, and the synthesis thereof can be found in the appropriate chapters of the Encyclopedia of Polymer Science and Technology (1985), which is herein incorporated by reference in its entirety. Exemplary thermoplastic films are described in U.S. Pat. No. 6,682,792 B2 and U.S. patent application Ser. No. 10/706,351, which are herein each incorporated by reference in their entirety. Preferably, the first thermoplastic film is FDA-approved for use with food that is intended for human consumption. Preferred polyester polymers exhibit favorable tensile properties, strength, durability and ability to withstand high temperature cooking applications, and resist adhesion to meat products. More preferred films are composed of oriented polyesters.

Preferred polyester block co-polymers are polyether-ester block copolymers or polyester-ester block copolymers. More preferably, polyester block copolymers are polyether-ester block copolymers. Polyetherester block copolymers and polyesterester block copolymers include the repeating alternating ester units of low crystallinity polyester segments A and cystallizable polyester segments B. In one embodiment, Segment A contains amorphous polyesters, polyethers, or combinations thereof and segment B contains crystalline or semi crystalline polybutylene terephthalate.

Polyether-ester block copolymers and polyester-ester block copolymers are commercially available under different trade names. For example, Arnitel® from DSM Engineering Inc., Hytrel® from DuPont and Riteflex® from Ticona are suitable polyether-ester and polyester-ester block copolymers. A preferred polyester block copolymer is the Arnitel® product line commercially available from DSM Engineering, such as for example Arnitel® EM630. Another preferred polyester elastomer film is MQ501, a biaxially-oriented, polyester based shrink film (25% machine direction shrink, 30% transverse direction shrink), which is produced by M & Q Packaging Corp., Schuylkill Haven, Pa. The MQ501 film has a vicat softening point of about 453° F.

"Polyofelin" as used herein includes all polyolefins known to those skilled in the art. Polyolefins include acyclic and cyclic hydrocarbons having one or more carbon-carbon double bonds, apart from the formal ones in aromatic compounds. Polyolefins subsumes alkenes and cycloalkenes and corresponding polyenes. Polyolefins also includes alkene co-polymers. The alkene polymers and alkene copolymers can be substituted with functional groups. A description of exemplary polyolefins can be found in the appropriate pages of the CRC Handbook of Chemistry and Physics, 79th ed. (1998), which is herein incorporated by reference in its entirety. For example polyolefins include polyethylene polymers, polypropylene polymers, and polyethylene/polypropylene copolymers.

Preferred polyolefins are linear low density polyethylene, low density polyethylene, high density polyethylene, polypropylene, ethylene vinyl acetate, polyethylene/polypropylene copolymers, and ultra low density polyethylene/octene copolymers. More preferably, polyolefins are linear low density polyethylene copolymers and ultra low density polyethylene/octene copolymers.

Polyolefins are commercially available from, for example, Voridian or Dow. An exemplary ultra low density ethylene/octene copolymer is commercially available as Attane™ 4301G from Dow.

"Nylon" as used herein means any nylon polymer known to those skilled in the art. "Nylon" includes commonly known polyamide polymers such as Nylon 6, and Nylon 66. Nylons are commercially available, such as for example, B4FN or KR4418 nucleated Nylon 6 from BASF.

When ranges are used herein for physical or chemical properties, such as temperature, or compositions ranges, all combinations and subcombinations of ranges and specific embodiments therein are intended to be included.

The first thermoplastic film is composed at least 85 weight percent of thermoplastic polymers. Preferably, the first thermoplastic film is composed at least 90 weight percent of thermoplastic polymers. More preferably, the first thermoplastic film is composed of from about 90 to about 99.5 weight percent of thermoplastic polymers. Still more preferably, the first thermoplastic film is composed of from about 95 to about 99.5 weight percent of thermoplastic polymers.

The first thermoplastic film has a gauge thickness of at least about 0.25 mil. Preferably, the first thermoplastic film has a gauge thickness of from about 0.5 mil to about 7.0 mils. More preferably, the first thermoplastic film has a gauge thickness of from about 1.0 mil to about 5.0 mils.

The first thermoplastic film has a vicat softening temperature of about 100° F. or greater. As used herein "vicat softening temperature" means the temperature at which a flat-ended needle penetrates a specimen of polymer to the depth of 1 mm under a specific load as described in ASTM D1525. The vicat softening temperature reflects the point of softening to be expected when a polymer material is used in an elevated temperature application. The vicat softening temperature of the first thermoplastic film is different than the vicat softening temperature of the second thermoplastic film. The vicat softening temperature of the first thermoplastic film may be higher or lower than the vicat softening temperature of the second thermoplastic film. Preferably, the first thermoplastic film has a vicat softening temperature of about 150° F. or greater, and more preferably greater than about 180° F. More preferably, the first thermoplastic film has a vicat softening temperature of about 220° F. or greater, and even more preferably greater than about 300° F. Still more preferably the first thermoplastic film has a vicat softening temperature of about 350° F. or greater, and even more preferably greater than about 400° F. In embodiments where the first thermoplastic film is a multilayer film, the above referenced vicat softening temperature is exhibited by the film layer in contact with the at least one vent seal. All combinations and subcombinations of the vicat softening temperature ranges cited above and all combinations and subcombinations of vicat softening temperature range endpoints are intended to be included, e.g., first thermoplastic films having a vicat softening temperature of from about 180° F. to about 300° F. are included.

The second thermoplastic film is a monolayer or multilayer film composed of conventional thermoplastic polymers, including elastomers, known to those skilled in the art. Second thermoplastic films include, for example, non-elastic polyesters, polyester elastomers, polyolefins, polyamides, such as for example nylons, poly vinyl chloride, polystyrene, or combinations thereof. Preferably the second thermoplastic film is a multilayer film composed of at least one layer of polyester elastomer. Preferably, the second thermoplastic films is FDA-approved for contact with food items that are intended for human consumption.

In one embodiment the second thermoplastic film is a multilayer film composed of a first layer of polyester elastomer and a second layer of polyolefin. In another embodiment, the second thermoplastic film is a multilayer film composed of at least one layer of polyester homopolymer, and at least one layer of polyester copolymer.

The second thermoplastic film includes exemplary commercially-available polyester lidding stock known to those skilled in the art. For example, the second thermoplastic film is commercially available as Phoenix PET 10.63 film from Phoenix Films, Inc., Clearwater, Fla. Phoenix PET 10.63 is a bilayer film composed of a first layer of homo-polymer polyester and a second heat seal layer. Another example of lidding stock is Mylar® OL biaxially oriented polyester film available from DuPont, Inc., Wilmington, Del. Mylar OL has two vicat softening points, 430° F. for the outside homopolymer polyester layer and about 250° F. for the inside heat seal layer. Yet another example of preferred lidding stock is Phoenix PET-TLF 100 available from Phoenix Films, Inc., Clearwater, Fla. Phoenix PET-TLF 100 is a biaxially-oriented film composed of a first layer of homopolymer polyester laminated to a polyethylene heat seal layer.

The vicat softening temperature of the second thermoplastic film is different than the vicat softening temperature the first thermoplastic film. The vicat softening temperature of the second thermoplastic film may be higher or lower than the vicat softening temperature of the first thermoplastic film. Preferably, the second thermoplastic film has a vicat softening temperature of about 100° F. or greater. Preferably, the second thermoplastic film has a vicat softening temperature of about 150° F. or greater, and more preferably greater than about 200° F. More preferably, the second thermoplastic film has a vicat softening temperature of about 220° F. or greater, and even more preferably greater than about 300° F. Still more preferably, the second thermoplastic film has a vicat softening temperature of about 325° F. or greater, and even more preferably greater than about 350° F. In embodiments where the second thermoplastic film is a multilayer film, the above referenced vicat softening temperature is exhibited by the film layer in contact with the at least one sidewall. All combinations and subcombinations of the vicat softening temperature ranges cited above and all combinations and subcombinations of vicat softening temperature range endpoints are intended to be included, e.g., second thermoplastic films having a vicat softening temperature of from about 150° F. to about 325° F. are included.

First and second thermoplastic films preferably have at least one film surface, i.e., the interior surface of food preparation bags, that exhibits low adhesion to food products at high cooking temperatures. The "low adhesion" surface will be in contact with a food product. Those skilled in the packaging and food preparation art recognize that increased meat adhesion occurs during high temperature cooking conditions, i.e., greater than about 210° F. Thus, in one embodiment, the layer of each of the first and second thermoplastic materials that is in contact with a food product has a vicat softening temperature of about 210° F. or greater and a crystalline melt temperature of about 248° F. or greater.

The second thermoplastic film has a gauge thickness of at least about 0.25 mil. Preferably, the second thermoplastic film has a gauge thickness of from about 0.5 mil to about 7.0 mils. More preferably, the second thermoplastic film has a gauge thickness of from about 1.0 mil to about 5.0 mils. In embodiments composed of a multilayered film, the second thermoplastic film may be composed of a plurality of film layers having varying gauge thickness that, in any combination of film thicknesses, result in a gauge thickness as described above.

The second thermoplastic film is composed at least 85 weight percent of thermoplastic polymers. Preferably, the first thermoplastic film is composed at least 90 weight percent of thermoplastic polymers. More preferably, the first thermoplastic film is composed of from about 90 to about 99.5 weight percent of thermoplastic polymers. Still more preferably, the first thermoplastic film is composed of from about 95 to about 99.5 weight percent of thermoplastic polymers.

The first and second thermoplastic films may optionally include conventional film additives known to those skilled in the art. Film additives include, for example, stabilizers, slip additives, antistats, antioxidants, colorants, dyes, or pigments, anti-fog additives, heat stabilizers, antimicrobials, oxygen scavengers, scents, processing agents, and combinations thereof.

First and second thermoplastic films, whether monolayer films or multilayered films, may be optionally stretch oriented. The term "stretch-oriented" is used herein to describe the process and resultant product characteristics obtained by stretching and immediately cooling a resinous polymeric material which has been heated to its orientation temperature so as to revise the molecular configuration of the material by physical alignment of the molecules to improve certain mechanical properties of the film such as, for example, tensile strength and tear strength, shrink properties as well as the optical properties of the film. Stretch-orientation increases the toughness and shrinkability of the film in comparison to films that are not stretch-oriented.

First and second thermoplastic films are optionally stretch-oriented by reheating the film to its orientation temperature and then stretching the film. The orientation temperature for a given film will vary with the different resinous polymers and blends thereof which include the film, and will generally be a range of temperatures based on such factors. In general, the orientation temperature may be stated to be above room temperature and below the melting point of the film, and will typically be at or near the glass transition temperature of the resins from which the film is made.

The process of stretching a film at its orientation temperature range may be accomplished in a number of ways such as, for example, by double bubble or tenter framing techniques. These and other techniques are well known in the art and involve stretching the film in the cross or transverse direction (TD) and/or in the longitudinal or machine direction (MD). When the stretching force is applied in one direction, uniaxial orientation results. When the stretching force is applied in two directions, biaxial orientation results. After being stretched, the film is rapidly cooled to quench and thus set or locked-in the oriented molecular configuration. Such an oriented and quenched film is said to be heat-shrinkable, i.e., without heat-setting as described immediately below, the film will tend to return toward its original, unoriented (unstretched) dimensions when subsequently heated to an appropriate temperature below its melting temperature range.

After locking-in the oriented molecular configuration by quenching, First and second thermoplastic films may also be heat-set by bringing the oriented film to a temperature near its orientation temperature while restraining the film in its stretched dimensions. This process, which is also know as annealing, produces a film with substantially less shrinkability, while retaining much of the advantages of orientation, including improved tensile strength and optical properties.

First thermoplastic films are preferably stretch-oriented in at least two directions, i.e., biaxially oriented, preferably in both the machine direction and transverse direction. In one embodiment, the first thermoplastic film preferably has an orientation ratio of at least about 2 in both of the directions in which they have been oriented. As used herein, the phrase orientation ratio refers to the multiplication product of the extent to which a film is expanded in any one direction during the orientation process. Thus, an orientation ratio of, e.g., 2 in the machine direction, indicates that the film has been expanded to twice its original dimension in the machine direction of the film. When a film is biaxially oriented, the orientation ratios are conventionally expressed as [machine direction (MD) ratio]×[transverse direction (TD) ratio] or [TD ratio]×[MD ratio], however designated. Thus, a biaxial orientation ratio of 2 in the MD and 3 in the TD would be expressed as a MD×TD orientation ratio of 2×3.

In one embodiment, the first and/or second thermoplastic film shrinks at temperatures sufficient to cook food products, including high temperature cooking temperatures. The degree of shrinkage of a thermoplastic polymer film at a particular temperature may be expressed in terms of a percentage of the original (unshrunk) total surface area of the provided film. The first and/or second thermoplastic film shrinks by at least about 5% at more than about 100° F. More preferably, the first and/or second thermoplastic film shrinks by at least about 20% at more than about 100° F. More preferably, the first and/or second thermoplastic film shrinks by from about 5% to about 50%, and more preferably from 25% to 40%, at more than about 100° F.

In another embodiment, the first and/or second thermoplastic film shrinks by at least about 5% at more than about 220° F. More preferably, the first and/or second thermoplastic film shrinks by at least about 20% at more than about 220° F. More preferably, the first and/or second thermoplastic film shrinks by from about 5% to about 50%, and more preferably from 25% to 40%, at more than about 220° F.

In another embodiment, the first and/or second thermoplastic film shrinks by at least about 5% at more than about 300° F. More preferably, the first and/or second thermoplastic film shrinks by at least about 20% at more than about 300° F. More preferably, the first and/or second thermoplastic film shrinks by from about 5% to about 50%, and more preferably from 25% to 40%, at more than about 300° F.

In yet another embodiment, food preparation bags are composed of a first thermoplastic film that is a monolayer film and a second thermoplastic film that is a multilayered film. The first thermoplastic film is composed of a monolayer biaxially oriented film composed of at least about 40 weight percent polyester homopolymer and at least about 40 weight percent polyester elastomer. Preferably, the first thermoplastic film is composed a monolayer biaxially oriented film composed of at least about 75 weight percent polyester homopolymer and no more than about 25 weight percent polyester elastomer. More preferably, the first thermoplastic film is composed of a monolayer biaxially oriented film composed about 75% by weight of polyester homopolymer and about 25% by weight polyester elastomer, e.g., MQ501 available from M & Q Packaging Corp., Schuylkill Haven, Pa. The second thermoplastic film is a multilayer film composed of a first layer of polyethylene terepthalate, and a second layer of amorphous polyester, e.g., Mylar OL film available from DuPont, Inc., Wilmington, Del. The first thermoplastic film is biaxially oriented so that it shrinks at least 25% in the machine direction and at least 30% in the transverse direction as measured at 210° F. These food preparation bags exhibit exemplary food preparation properties for beef and poultry at cooking temperatures above 350° F. and provide venting at temperatures above 250° F. These food preparation bags are from about 1.0 mil to about 4 mils thick. Preferably, food preparation bags are composed of 1.0 mil of MQ501 film and 1.0 mil of Mylar OL film.

Figure 3C:
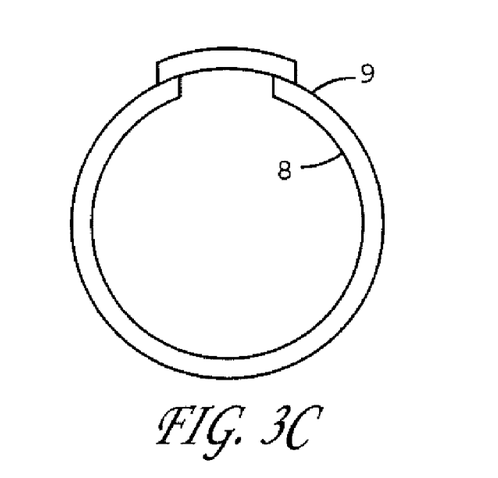
FIG. 3C is a cross sectional view of another exemplary high temperature, venting food preparation bag.

FIG. 3C is a cross sectional view of another exemplary high temperature, venting food preparation bag. Referring to FIG. 3C, in yet another embodiment, food preparation bags are composed of a first thermoplastic film that is a multilayer film and a second thermoplastic film composed that is a monolayer film. The multilayered first thermoplastic film is composed of a first layer of polyethylene terepthalate, and a second layer of amorphous polyester, e.g., Mylar OL film available from DuPont, Inc., Wilmington, Del. The second thermoplastic film is composed of a monolayer biaxially oriented film composed of at least about 40 weight percent polyester homopolymer and at least about 40 weight percent polyester elastomer. The second thermoplastic film is composed a monolayer biaxially oriented film composed of at least about 75 weight percent polyester homopolymer and no more than about 25 weight percent polyester elastomer. Preferably, the second thermoplastic film is composed of a monolayer biaxially oriented film composed of about 75% by weight of polyester homopolymer and about 25% by weight polyester elastomer, e.g., MQ501 available from M & Q Packaging Corp., Schuylkill Haven, Pa.

Methods for making food preparation bags include the steps of first providing first and second thermoplastic films and forming a bag structure without adhesive seals. Conventional bag making techniques, known by those skilled in the art are utilized to fabricate food preparation bags. For example, food preparation bags are produced from tubular stock of a first thermoplastic film by sealing one end of a length of tubular film and subsequently forming at least one vent by slitting, cutting, perforating, puncturing the film or some combination thereof. Thereafter, vent seals composed of a second thermoplastic film are provided and attached to the exterior surface of the at least one sidewall, thereby closing the at least one vent. Alternatively, food preparation bags are made from individual sheets of first thermoplastic film, by sealing an edge or edges of superimposed sheets of film or alternatively by folding a rectangular sheet in half and sealing the two sides that are proximate to the folded side. The at least one vent seals composed of a second thermoplastic film are attached to the at least one sidewall of the food preparation bag to close the at least one vent.

Food preparation bags include first and second thermoplastic films having vicat softening temperatures which provide venting, i.e., opening of the at least one vent, at a desired temperature range. In one embodiment, venting at a predetermined temperature is achieved by providing a second thermoplastic film having a vicat softening temperature that corresponds with the temperature at which a venting seal is designed to vent, i.e., the first and second thermoplastic films at least partially detach from one another. Therefore, unlike conventional food preparation bags which incorporate a "weak seal" that will break under gaseous or liquid pressure, first and second thermoplastic films are provided which have vicat softening points that are predictive of the cooking temperature at which seal venting will occur. For example, if venting is desired at a temperature of about 150° F. then a second thermoplastic film having a vicat softening point of about 150° F. is utilized. Accordingly, one does not have to sacrifice food preparation bag integrity by designing "weak seals," "weak sidewalls," or "weak points."

Figure 4A:
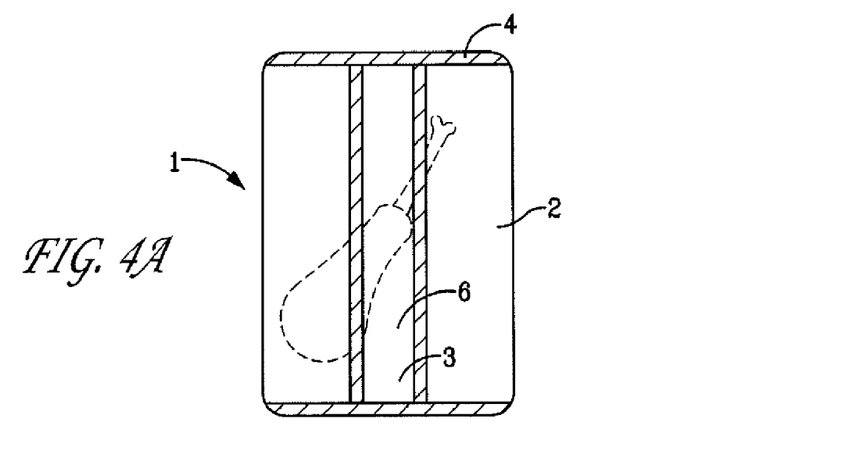
FIG. 4A is a top view of an exemplary high temperature, venting food preparation bag containing a food product.

Methods of using food preparation bags include packaging food products. FIG. 4A provides top view of an exemplary high temperature, venting food preparation film. As shown in FIG. 4A, a food product 10 is placed in a food preparation bag 1. Distal edge 7 is sealed using any conventional non adhesive seal known to those skilled in the art, or in the alternative a traditional metal clip, thereby closing open end 5 and enclosing food item 10 within the bag 1. Food preparation bags 1 may be either vacuum packed or prepared so that a quantity of air remains within the interior of the container. Different sizes and shapes of bags for accommodating all varieties of food items are contemplated.

Methods of using food preparation bags include preparing food products at high temperature. Food products are prepared by, first, providing a high temperature, venting food preparation bag, and second, heating a food product in the food preparation bag to a cooking temperature sufficient to cook a food product. Preferably, the food product is prepared at a high cooking temperature, i.e., at about 220° F. or greater. More preferably, the food product is prepared at a cooking temperature of about 250° F. or greater. More preferably, the food product is prepared at a cooking temperature of about 300° F. or greater. Still more preferably, the food product is prepared at a cooking temperature of about 350° F. or greater. Even more preferably, a food product is prepared at cooking temperatures of 400° F. or greater.

Food preparation bags are useful in industrial, or otherwise large scale, as well as small-scale food preparation enterprises, particularly in the commercial meat-preparation trade, as are the food preparation bags that are made according to the provided methods. Non-commercial, domestic uses for the present invention are also contemplated.

Food preparation bags are useful in the food handling industry, particularly in the meat packaging industry, and in the food preparation industry. Film preparation bags are constructed according to the intended use of such bags, for example, preparation of beef items, poultry, pork, non-meat items, etc.

During high temperature cooking, food preparation bags release moisture and gases contained therein by opening the at least one vent in the at least one sidewall. Food preparation bags do not require a buildup of internal fluid or gaseous pressure in order to affect initial or subsequent venting, and food preparation bags may be employed with vacuum-packaging if desired.

Figure 4B:
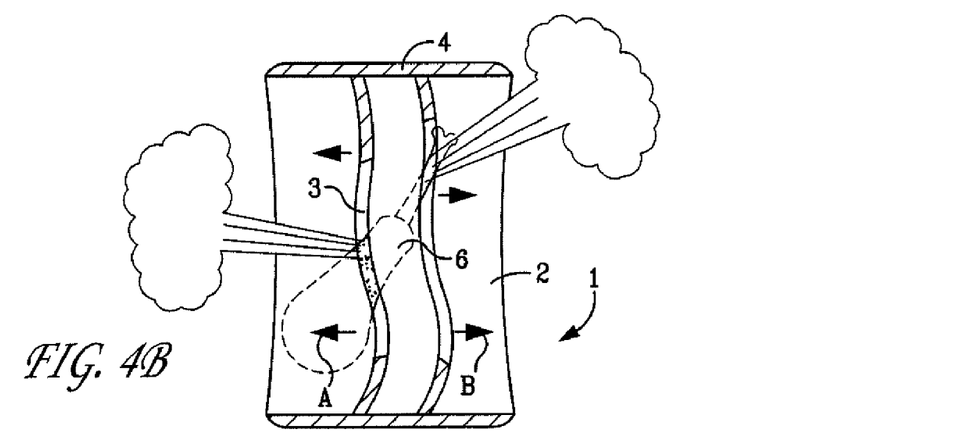
FIG. 4B is a top view of an exemplary high temperature, venting food preparation bag containing a food product at greater than 100° F.
Figure 4C:
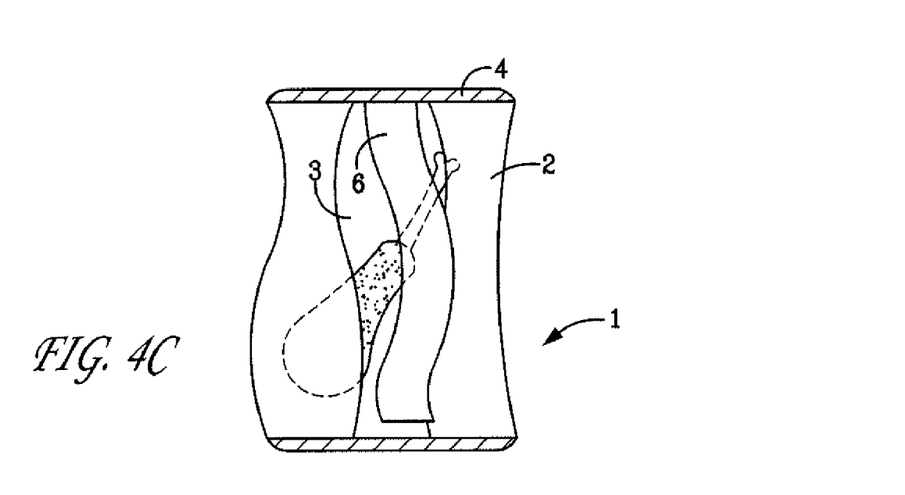
FIG. 4C is a top view of an exemplary high temperature, venting food preparation bag containing a food product at greater than 220° F.

Operation of the at least one vent is explained with reference to FIGS. 4A, 4B, and 4C. FIG. 4B is a top view of an exemplary high temperature, venting food preparation bag containing a food product at greater than 100° F. FIG. 4C is a top view of an exemplary high temperature, venting food preparation bag containing a food product at greater than 220° F. Referring to FIG. 4A, in operation at room temperature, food preparation bags 1 have durable seals between the at least one sidewall 2 and at least one vent seal 6, which exhibit seal strength sufficient to enable the use of food preparation bags 1 for packaging food products for transportation storage, and preparation. Preferably, the non-adhesive seal between the at least one sidewall 2 and the at least one vent seal 6 is similar in strength to the non adhesive seals joining the first thermoplastic film at the open end 5 and sealed end 4 to seal the food preparation bag 1.

Referring to FIG. 4B, as cooking temperature is increased from room temperature to the vicat softening temperature of the second thermoplastic film, the seal between the first thermoplastic film and the second thermoplastic film begins to weaken.

When the cooking temperature is near the vicat softening temperature of the second thermoplastic film, the seal between the first and second thermoplastic film at least partially vents thereby at least partially detaching the second thermoplastic film from the first thermoplastic film. The at least one vent is thus at least partially opened to allow the escape of moisture and gases from within the bag.

Referring to FIG. 4C, when the cooking temperature has substantially exceeded the vicat softening temperature of the second thermoplastic film, the at least one seal between the first and second thermoplastic films vents thereby substantially detaching the second thermoplastic film from the first thermoplastic film. The at least one vent is opened to allow the escape of moisture and gases from within the bag. The venting process is not dependent upon the accumulation of internal fluid or gaseous pressure, and is compatible with vacuum packaging techniques. Cooking with food preparation bags 1 therefore achieves vented cooking of a food product to providing browning and crisping, without manipulating the food preparation bag after it has been placed in an oven.

Preferably, the first thermoplastic film shrinks when it is heated so that the shrinkage of the first thermoplastic film puts tension on the seal between the first and second thermoplastic films. Referring to FIGS. 4B and 4C, the arrows "A" and "B" indicate the direction in which the first thermoplastic film typically contracts, thereby causing breakage of the seal between the first and second thermoplastic films and concomitant release of gas and/or fluid from the package interior.

First thermoplastic film which exhibit high shrinking are utilized to increase venting in cooking applications where browning and crisping are preferred. At high cooking temperatures, further contraction of the first thermoplastic film occurs, thereby permitting extensive exposure of the food item to the ambient cooking environment. Referring to FIG. 4C, the at least one vent seal 6 may remain in contact with part of the food item after contraction of the first thermoplastic film because there are no residual adhesives associated with the vent seal. If cooking is permitted to continue, the package contents will have prolonged direct exposure to the heat of the cooking apparatus, and drying, browning, and crisping results. The shrunken thermoplastic film will still be present beneath the food item, functioning as a flexible cooking tray that protects the bottom of the food item from the heating element and retains juices and other moisture that originate from the food item.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

EXAMPLES

Aspects of high temperature venting food preparation bags are further described in the following examples. It should be understood that these examples, while indicating certain features of the food preparation bags, are given by way of illustration only, and should not be construed as limiting the appended claims.

Films used to prepare food preparation bags were tested to demonstrate venting at a target cooking temperature, or temperature range, and that venting occurs independent of room temperature seal strength, i.e. without sacrificing low temperature seal strength.

Example 1

Four films, Test Film A, Test Film B, Test Film C, and Test Film D, were prepared and heat sealed to determine (a) seal strength at room temperature using ASTM F88-00, and (b)

cooking temperature at which a heat seal failed. Test Film A, a first thermoplastic film used to make bag sidewalls, was a 1.0 mil biaxially oriented monolayer thermoplastic polymer composed of 75% by weight of polyester homopolymer and 25% by weight polyester elastomer. Test Film A had 25% shrink in the machine direction and 30% shrink in the transverse direction at 212° F. Test Film A had a vicat softening point above 400° F. Test Film A is commercially available from M & Q Packaging Corp., Schuylkill Haven, Pa.

Test Film B, a second thermoplastic film used to make vent seals, was a biaxially-oriented bi-layer film composed of a 0.75 mil first layer of polyester homopolymer, and a second layer of heat sealable polymer. Test Film B did not exhibit measurable ability to shrink at elevated temperature. Test Film B is commercially available as "Phoenix PET 10.63" from Phoenix Films, Inc., Clearwater, Fla.

Test Film C, a second thermoplastic film used to make vent seals, was a biaxially-oriented bi-layer film composed of a 1.0 mil first layer of polyester homopolymer and a 3.0 mil second layer of polyethylene. Test Film C did not exhibit measurable ability to shrink at elevated temperature. Test Film C displayed a vicat softening point between 180° F. to 220° F. Test Film C is commercially available as "Phoenix PET-TLF 100" from Phoenix Films, Inc., Clearwater, Fla.

Test Film D, a third thermoplastic film used to make vent seals, was a biaxially-oriented bi-layer film having a total thickness of 1.0 mil, which was composed of a layer of clear PET (homo-polymer polyester) and an inside heat seal layer of APET (amorphous polyester). Test film D did not exhibit the ability to shrink at elevated temperature. Test film D displayed a vicat softening point at the heat seal layer of about 250° F. Test Film D is commercially available as "DuPont® Mylar® OL" (DuPont®, Wilmington, Del.). The composition of each Test Film is summarized below in Table 1:

TABLE 1

| Film Type | Description |
|---|---|
| | First Thermoplastic Polymer: |
| Test Film A | Blend:<br>75% polyester homopolymer, and<br>25% polyester elastomer. |
| | Second Thermoplastic Polymer: |
| Test Film B | First layer - polyester homopolymer<br>Second layer - heat seal layer |
| Test Film C | First layer - polyester homopolymer<br>Second layer - polyethylene |
| Test Film D | First layer - polyester homopolymer<br>Second layer - amorphous polyester<br>heat seal layer |

One-inch wide strips of each film were prepared and heat sealed to each other using an impulse heat sealer. A strip of Test Film A was heat sealed to a second strip of Test Film A. A strip of Test Film A was then heat sealed to Test Film B with the heat seal layer of Test Film B in contact with Test Film A. Test Film A was heat sealed to Test Film C with the polyethylene layer of Test Film C in contact with Test Film A. Lastly, Test Film A was heat sealed to Test Film D with the amorphous polyester layer of Test Film D in contact with Test Film A.

Room-temperature, i.e., "baseline," seal strengths were measured according to ASTM F88-00 test methodology. Seal strength results are identified in Table 2, below:

TABLE 2

| Seal | Seal Strength<br>(pounds force/in. of seal width)<br>ASTM F88-00 |
|---|---|
| Test Film A to Test Film A | 6.1 ± 1.9 |
| Test Film A to Test Film B | 1.4 ± 0.2 |
| Test Film A to Test Film C | 6.3 ± 1.1 |
| Test Film A to Test Film D | 1.15 +/− 0.2 |

It was observed that the respective room-temperature seal strengths between Test Film A and Test Film C were similar to the seal strength exhibited by a seal between Test Film A and Test Film A. Thus, Test Film A-Test Film C seals exhibited similar seal strength compared to seals that may be used to form food preparation bag, e.g., Test Film A-Test Film A. Room-temperature seal strength between Test Film A and Test Film B and between Test Film A and Test Film D were lower than other tested combinations.

Example 2

Each of the four co-joined film samples were hung in a conventional oven. A single eight-ounce weight was suspended from each sample in order to provide a separation force. The oven was activated, and the interior temperature was increased in 25° F. increments every half-hour, to a maximum temperature of 400° F., while the film samples were observed. The temperature at which the films parted was noted, and the results are provided in Table 3, below.

TABLE 3

| Seal Type | Temperature At Which<br>Failure Occurred |
|---|---|
| Test Film A to Test Film B | 100° F. |
| Test Film A to Test Film C | 150° F. to 175° F. |
| Test Film A to Test Film D | 250° F. |
| Test Film A to Test Film A | >400° F. (no failure) |

The results indicated that while Test Film A-Test Film A and Test Film A-Test Film C combinations displayed a similar baseline seal strength, at elevated temperatures the seal in the latter combination failed at a lower temperature compared to the seal between two strips of Test Film A. Thus, the rupture of heat seals at elevated temperatures occurs independent of baseline seal strength. Accordingly, venting during cooking occurs independent of baseline seal strength, so that one is not required to design inherently weak seals into a cooking container in order to achieve seal rupture and venting during oven-cooking. Instead, seal venting can be designed to occur at predetermined temperatures, based on the selection of materials for the at least one sidewall 2 and vent seal of the food preparation bag.

What is claimed is:

1. A high temperature, venting food preparation bag comprising:
   a sealed end,
   at least one side wall extending away from said sealed end, each of said at least one side wall having a distal edge, an interior surface, and an exterior surface, wherein said sidewall comprises a first thermoplastic film comprising at least about 75 weight percent, based on the total weight of said first thermoplastic film, of a thermoplastic polymer, the first thermoplastic film suitable for high temperature applications greater than about 220° F., an open end defined by said distal edge, at least one vent in said at least one side wall, said at least one vent connecting said interior surface to said exterior surface, at least one vent seal comprising a second thermoplastic film attached to one of said exterior surface or said interior surface of said at least one sidewall to close said at least one vent, the second thermoplastic film suitable for high temperature applications greater than about 220° F., and a non-adhesive seal attaching said at least one vent seal to said exterior or interior surface of said at least one sidewall, wherein said first thermoplastic film and said second thermoplastic film comprise different materials having different heat shrink properties, wherein one of said first thermoplastic film and said second thermoplastic film comprises a heat shrink material that shrinks at least 5% at more than about 100° F. causing the vent seal to at least partially detach from the at least one sidewall.

2. The high temperature, venting food preparation bag according to claim 1 wherein the vicat softening temperature of the first thermoplastic film is different than the vicat softening temperature of the second thermoplastic film.

3. The high temperature, venting food preparation bag according to claim 1 wherein the vicat softening temperature of the first thermoplastic film is about 150° F. or greater and the vicat softening temperature of the second thermoplastic film is about 100° F. or greater.

4. The high temperature, venting food preparation bag according to claim 1 wherein the at least one vent comprises a gap between two sidewalls.

5. The high temperature, venting food preparation bag according to claim 1 wherein the at least one vent comprises a plurality of vents.

6. The high temperature, venting food preparation bag according to claim 1 wherein the at least one vent comprises a slit extending substantially across the length of said bag and said vent seal further comprises a strip to cover the slit.

7. The high temperature, venting food preparation bag according to claim 1 wherein said first thermoplastic film is composed of non-elastic polyester, polyester elastomer, or combinations thereof.

8. The high temperature, venting food preparation bag according to claim 1 wherein said first thermoplastic film is composed of a polyester-ester block copolymer, a polyether-ester block copolymer, or combinations thereof.

9. The high temperature, venting food preparation bag according to claim 1 wherein said first thermoplastic film is composed of a nylon.

10. The high temperature, venting food preparation bag according to claim 1 wherein said first thermoplastic film is composed of a poly vinyl chloride, polystyrene, or combinations thereof.

11. The high temperature, venting food preparation bag according to claim 1 wherein said first thermoplastic film is composed of a polyolefin.

12. The high temperature, venting food preparation bag according to claim 1 wherein said first thermoplastic film is a linear low density polyethylene, low density polyethylene, high density polyethylene, polypropylene, ethylene vinyl acetate, polybutylene/polypropylene copolymers, and ultra low density polyethylene/octane copolymers.

13. The high temperature, venting food preparation bag according to claim 1 wherein said first thermoplastic film or said second thermoplastic film is a monolayer film, or wherein both the first thermoplastic film and second thermoplastic film are monolayer films.

14. The high temperature, venting food preparation bag according to claim 1 wherein said first thermoplastic film or said second thermoplastic film is a multilayer film, or wherein both the first thermoplastic film and second thermoplastic film are multilayer films.

15. The high temperature, venting food preparation bag according to claim 1 wherein said second thermoplastic film is a multilayer film comprising at least one layer of non-elastic polyester.

16. The high temperature, venting food preparation bag according to claim 1 wherein said second thermoplastic film is a multilayer film comprising at least one layer of polyester elastomer.

17. The high temperature, venting food preparation bag according to claim 1 wherein said second thermoplastic film is a multilayer film comprising:
   i. a first layer of polyester, and,
   ii. a second layer of polyolefin, polyester copolymer, or amorphous polyester.

18. The high temperature, venting food preparation bag according to claim 1 wherein said first thermoplastic film is a monolayer biaxially oriented film composed of about 75% by weight of polyester homopolymer and about 25% by weight polyester elastomer, and said second thermoplastic film is a multilayer film comprising a first layer of polyethylene terepthalate, and a second layer of amorphous polyester.

19. The high temperature, venting food preparation bag according to claim 1 wherein said first thermoplastic film is a multilayer film comprising a first layer of polyethylene terepthalate, and a second layer of amorphous polyester and said second thermoplastic film is a monolayer biaxially oriented film composed of about 75% by weight of polyester homopolymer and about 25% by weight polyester elastomer.

20. The high temperature, venting food preparation bag according to claim 1 wherein said non-adhesive seal comprises one of: a heat seal and an ultrasonic seal.

21. The high temperature, venting food preparation bag according to claim 1 wherein said first thermoplastic film shrinks by at least about 5% at more than about 150° F. and at least partially detaches from said vent seal.

22. The high temperature, venting food preparation bag according to claim 1 wherein said first thermoplastic film shrinks by from about 5% to about 40% at more than 150° F. and at least partially detaches from said vent seal.

23. A high temperature oven bag for cooking a food product comprising:
   a side wall comprising a first thermoplastic film suitable for high temperature applications greater than about 220° F.;
   an interior cavity defined by the side wall;
   a vent in the side wall to vent the interior cavity during high temperature applications;
   a vent seal disposed over and covering the vent, the vent seal comprising a second thermoplastic film suitable for high temperature applications greater than about 220° F.;
   a non-adhesive seal connecting the second thermoplastic film to the first thermoplastic film and sealing the vent;
   one of the first thermoplastic film and the second thermoplastic film comprising a heat shrinkable material that shrinks by about 5% or more at temperatures greater than about 100° F.;
   wherein the first thermoplastic film of the sidewall and the second thermoplastic film of the vent seal comprise different materials that separate when exposed to high temperatures greater than about 220° F. to vent the interior cavity.

24. The high temperature oven bag of claim 23, wherein one of the first thermoplastic film and the second thermoplastic film comprising a heat shrinkable material that shrinks by about 20% at temperatures greater than about 220° F.

25. The high temperature oven bag of claim 23, wherein one of the first thermoplastic film and the second thermoplastic film comprising a heat shrinkable material that shrinks by about 5% to about 50% at temperatures greater than about 220° F.

26. The high temperature oven bag of claim 23, wherein one of the first thermoplastic film and the second thermoplastic film comprising a heat shrinkable material that shrinks by about 25 to about 40% at temperatures greater than about 220° F.

27. The high temperature oven bag of claim 23, wherein the first thermoplastic film and the second thermoplastic film of the high temperature oven bag are suitable for use at temperatures up to about 250° F.

28. The high temperature oven bag of claim 23, wherein the first thermoplastic film and the second thermoplastic film of the high temperature oven bag are suitable for use at temperatures up to about 300° F.

29. The high temperature oven bag of claim 23, wherein the first thermoplastic film and the second thermoplastic film of the high temperature oven bag are suitable for use at temperatures up to about 400° F.

30. The high temperature oven bag of claim 23, wherein the non-adhesive seal comprises a heat seal.

31. The high temperature oven bag of claim 23, wherein the first thermoplastic film comprises a first vicat softening temperature and the second thermoplastic film comprises a second vicat softening temperature, the first vicat softening temperature and the second vicat softening temperature being different temperatures.

32. The high temperature oven bag of claim 31, wherein first thermoplastic film and the second thermoplastic film comprise different film materials, and wherein the first vicat softening temperature and the second vicat softening temperature comprising different temperatures.

33. The high temperature oven bag of claim 31, wherein one of the first vicat softening temperature and the second vicat softening temperature is a lower temperature than the other, wherein the thermoplastic film having the lower vicat softening temperature shrinks relative to the other thermoplastic film when the oven bag is subject to high temperatures, thereby detaching the first thermoplastic film and the second thermoplastic film to expose the vent and vent the interior cavity.

34. The high temperature oven bag of claim 33, wherein the lower vicat softening temperature corresponds to a predetermined temperature at which the oven bag is designed to vent during high temperature applications.

35. The high temperature oven bag of claim 33, wherein:
the side wall is a shrink film and comprises a blend of about 75% polyester homopolymer and about 25% polyester elastomer, the first thermoplastic film having a film thickness in the range of between 0.5 mils to about 7 mils; and
the vent seal is not a shrink film and comprises a homopolymer polyester film with a amorphous polyester heat seal layer, the second thermoplastic film having a film thickness in the range of between 0.5 mils to about 7 mils.

* * * * *